(12) United States Patent
Purushothaman et al.

(10) Patent No.: US 9,684,556 B2
(45) Date of Patent: Jun. 20, 2017

(54) METHOD AND APPARATUS FOR A SELF-ADJUSTING CALIBRATOR

(71) Applicant: Bank of America Corporation, Charlotte, NC (US)

(72) Inventors: Sasidhar Purushothaman, Hyderabad (IN); Srikarthik Gunasekaran, Chennai (IN); Tanvir Sharma, Mumbai (IN)

(73) Assignee: Bank of America Corporation, Charlotte, NC (US)

( * ) Notice: Subject to any disclaimer, the term of this patent is extended or adjusted under 35 U.S.C. 154(b) by 92 days.

(21) Appl. No.: 14/880,374

(22) Filed: Oct. 12, 2015

(65) Prior Publication Data
US 2017/0102980 A1    Apr. 13, 2017

(51) Int. Cl.
*G06F 11/00* (2006.01)
*G06F 11/07* (2006.01)

(52) U.S. Cl.
CPC ........ *G06F 11/079* (2013.01); *G06F 11/0751* (2013.01); *G06F 11/0772* (2013.01); *G06F 11/0787* (2013.01); *G06F 11/0793* (2013.01)

(58) Field of Classification Search
CPC ............. G06F 11/0751; G06F 11/0772; G06F 11/0787; G06F 11/079; G06F 11/0793
See application file for complete search history.

(56) References Cited

U.S. PATENT DOCUMENTS

| | | | |
|---|---|---|---|
| 5,568,491 A * | 10/1996 | Beal | G05B 13/028 714/26 |
| 6,237,114 B1 | 5/2001 | Wookey et al. | |
| 8,205,122 B1 | 6/2012 | Leverich et al. | |
| 9,053,216 B1 | 6/2015 | Coleman et al. | |
| 2004/0153844 A1 | 8/2004 | Ghose et al. | |
| 2008/0148110 A1 | 6/2008 | Bhamidipaty et al. | |
| 2009/0182794 A1* | 7/2009 | Sekiguchi | G06F 11/0748 |

(Continued)

OTHER PUBLICATIONS

"Computer Cluster," Sep. 3, 2015, Wikimedia Foundation, Inc.
(Continued)

*Primary Examiner* — Joshua P Lottich
(74) *Attorney, Agent, or Firm* — Weiss & Arons LLP; Michael A. Springs, Esq.

(57) ABSTRACT

A self-adjusting calibrator is provided. The calibrator may include a calibrator datastore. The calibrator datastore may store assimilated performance data. The assimilated performance data may relate to a collection of configuration items. The calibrator datastore may also store performance metrics. The performance metrics may map historic error events in a system to a plurality of configuration items. The calibrator may also include an optimal value computation engine. The optimal value computation engine may be in communication with the calibrator datastore. The optimal value computation engine may determine an optimal threshold value for each configuration item in the collection of configuration items. The optimal threshold value may enable a receiver, which may be associated with calibrator datastore, to receive true error event information that occurred in the system. The optimal threshold value may also prevent the receiver from receiving false error event information that occurred in the system.

6 Claims, 8 Drawing Sheets

(56) References Cited

U.S. PATENT DOCUMENTS

| | | |
|---|---|---|
| 2010/0164715 A1 | 7/2010 | Buller et al. |
| 2010/0174812 A1 | 7/2010 | Thomas et al. |
| 2012/0110153 A1* | 5/2012 | Atkins ................ H04L 12/2602 709/223 |
| 2012/0144020 A1* | 6/2012 | Carey ................ H04L 43/0823 709/224 |
| 2012/0204068 A1* | 8/2012 | Ye ........................ G06F 11/0709 714/57 |
| 2012/0304012 A1* | 11/2012 | Atkins ................ H04L 41/0622 714/37 |
| 2013/0097620 A1* | 4/2013 | Carey .................... G06F 9/542 719/318 |
| 2013/0132149 A1 | 5/2013 | Wei et al. |
| 2014/0019814 A1 | 1/2014 | McNairy et al. |
| 2014/0040673 A1* | 2/2014 | Carey ................. G06F 11/0709 714/48 |
| 2014/0047273 A1* | 2/2014 | Carey ................. G06F 11/0709 714/37 |
| 2015/0033243 A1* | 1/2015 | Carey .................... G06F 9/542 719/318 |
| 2015/0121136 A1 | 4/2015 | Namkoong et al. |
| 2015/0193296 A1 | 7/2015 | Chen et al. |
| 2015/0195165 A1* | 7/2015 | Boger ................ G06F 11/0787 709/224 |
| 2015/0355976 A1* | 12/2015 | Carey ................. G06F 11/1441 714/23 |

OTHER PUBLICATIONS

"Load Balancing (computing)," Jul. 28, 2015, Wikimedia Foundation, Inc.
"Active/Passive vs. Active/Active Clustering," Jan. 17, 2005, SQLMag.com.

* cited by examiner

FIG. 1

| Situation Name | TH Effectiveness | Existing Threshold | Recommended Threshold | Comments |
|---|---|---|---|---|
| W_abc_def_11_Crit-001@hostname | 5-4 | 90% | 95% | Monitor threshold effectiveness is calculated as a percentage. |
| W_abc_xyz_22_Warn-001@hostname | 6-6 | 95% | 90% | Historical performance data, Event Trend and Heuristic Knowledge would be the data points for the metric. |
| W_1mn_opg_3_Warn-002@hostname | 8 | 85% | 85% | Benefits gained from incorporating a qualitative process include- 'identification of redundant scenarios', 'Reduced false positives' & Evironmental Stability. |
| W_rstv_444_Crit-001@hostname | 8 | | | |
| W_def_00_6_Crit-002@hostname | 8 | 90% | 90% | The number of false positives and the number of real events uncaptured would account for the offset of TH efficiency. |
| W_aaa_444_rr33_War001@hostname | 8 | | | |

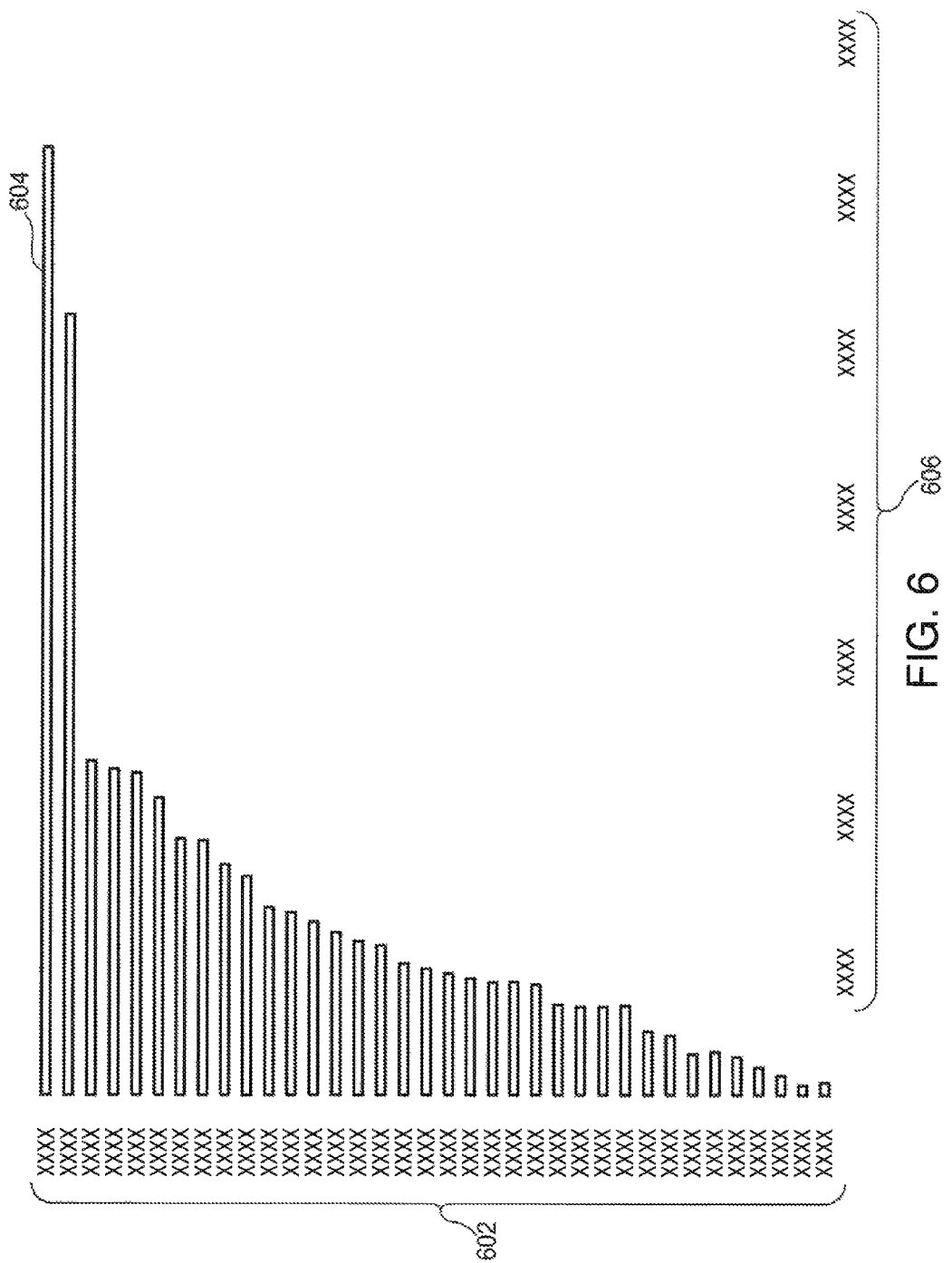

METHOD AND APPARATUS FOR A SELF-ADJUSTING CALIBRATOR

CROSS-REFERENCE TO RELATED APPLICATION

Co-pending, Commonly-Assigned application Ser. Nos. 14/880,421 entitled "Detection, Remediation and Inference Rule Development for Multi-layer Information Technology ("IT") Structures"and Ser. No. 14/880,349 entitled "Event Correlation and Calculation Engine", filed on event date herewith, are hereby incorporated by reference herein in their entirety.

FIELD OF TECHNOLOGY

The present invention relates to calibration. More specifically, this invention relates to self-monitoring and self-adjusting calibrators.

BACKGROUND

Monitoring errors in a system is essential to the system's continuous functioning. Monitoring enables Information Technology ("IT") personnel to identify errors and repair the identified errors. Monitoring also enables IT personnel to identify which areas within a system require additional resources and/or added supervision.

Because of substantially constantly changing environmental and systematic conditions, conventional monitoring may fail to detect true errors and incorrectly label typical performance events as errors. This may cause system error logs to contain incorrect and/or inconsistent information. The incorrect and/or inconsistent error information may also waste system resources as well as waste IT personnel time.

Therefore, the need exists for a dynamic monitoring system. It would be desirable for a dynamic monitoring system to include a self-adjusting calibrator. It would be desirable for the self-adjusting calibrator to calibrate the monitor to preserve the effectiveness of the monitor.

SUMMARY

A calibrator is provided. The calibrator may include a continuous performance and error data pooler. The continuous performance and error data pooler may retrieve and pool error events and performance events from a collection of alerting sources. The collection of alerting sources may include personal computers, mainframes, technical support systems, error collection modules, testing environments, system layers, application layers and/or any other suitable sources.

The calibrator may also include a patternizer. The patternizer may pattern the retrieved error events and performance events. Based on the patterns, the patternizer may associate the error events and the performance events with at least one configuration item included in a plurality of configuration items. In some embodiments, the patternizer may associate each of the error events and each of the performance events with several configuration items from among the plurality of configuration items.

The configuration items may relate to a specific technological area with which the error events and/or the performance events are associated. Examples of configuration items may be operating system warnings, operating system critical warnings, database warnings, database critical warnings, application warnings, application critical warnings, CPU-related warnings, log monitoring, file systems, processes, memory, clusters, event logs, general machine down alerts, logical disk spaces, security monitor service alerts, rebooting from bug checks, scheduling event logs, service downs, service hungs, time synchronous differences, time synchronous events logs, unexpected shut-downs, virtual memory event logs, virus scan time, group owner changes, customer group down and/or cluster disk fatal events.

Each configuration item may include a baseline. The baseline may be a point at which an event changes from a performance event to an error event. Exemplary configuration item baselines may include a threshold number of occurrences of a set of events and/or the occurrence of a set of events in a particular pattern. An exemplary configuration item baseline may include a CPU crossing a threshold with associated disk read failure more than a predetermined number of times. An additional exemplary configuration item baseline may include a CPU utilizing a volume of memory that is greater than a baseline value more than a predetermined number of times.

Additional exemplary configuration item baselines may be created and/or modified based on an event and/or behavioral patterns of error events and/or performance events.

In some embodiments, an Event Correlation and Calculation Engine may identify a configuration item and/or error event.

The calibrator may also include a detector. The detector may detect a threshold effectiveness level relating to a particular configuration item.

The calibrator may also include a data assimilator and decisioning module. The data assimilator and decisioning module may determine a tier in which the error events and the performance events occurred. The tier may be included in a plurality of tiers. The plurality of tiers may include a web tier, an application tier and a database tier.

The calibrator may also include a configuration-item-based calibration module. The configuration-item-based calibration module may adjust a threshold effectiveness level for each configuration item based on the tier in which the error events and/or performance events associated with the configuration item occurred. The configuration-item-based calibration module may adjust the threshold effectiveness level for each configuration item based on a determination that the retrieved error events were in fact error events and/or a determination of the accuracy of a characterization of the performance events.

A relatively high threshold effectiveness level associated with a particular configuration item may indicate that a threshold associated with that particular configuration item may be at an acceptable level and, therefore, the threshold may not require shifting. A relatively low threshold effectiveness level associated with a particular configuration item may indicate that a threshold associated with that particular configuration item may require shifting. For the purposes of this application, threshold shifting may be understood to include raising or lowering the threshold level.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 1 shows an illustrative graphical user interface ("GUI") in accordance with an embodiment of the invention.

FIG. 6 shows an illustrative graph in accordance with an embodiment of the invention;

DETAILED DESCRIPTION OF THE DISCLOSURE

Figure 2:
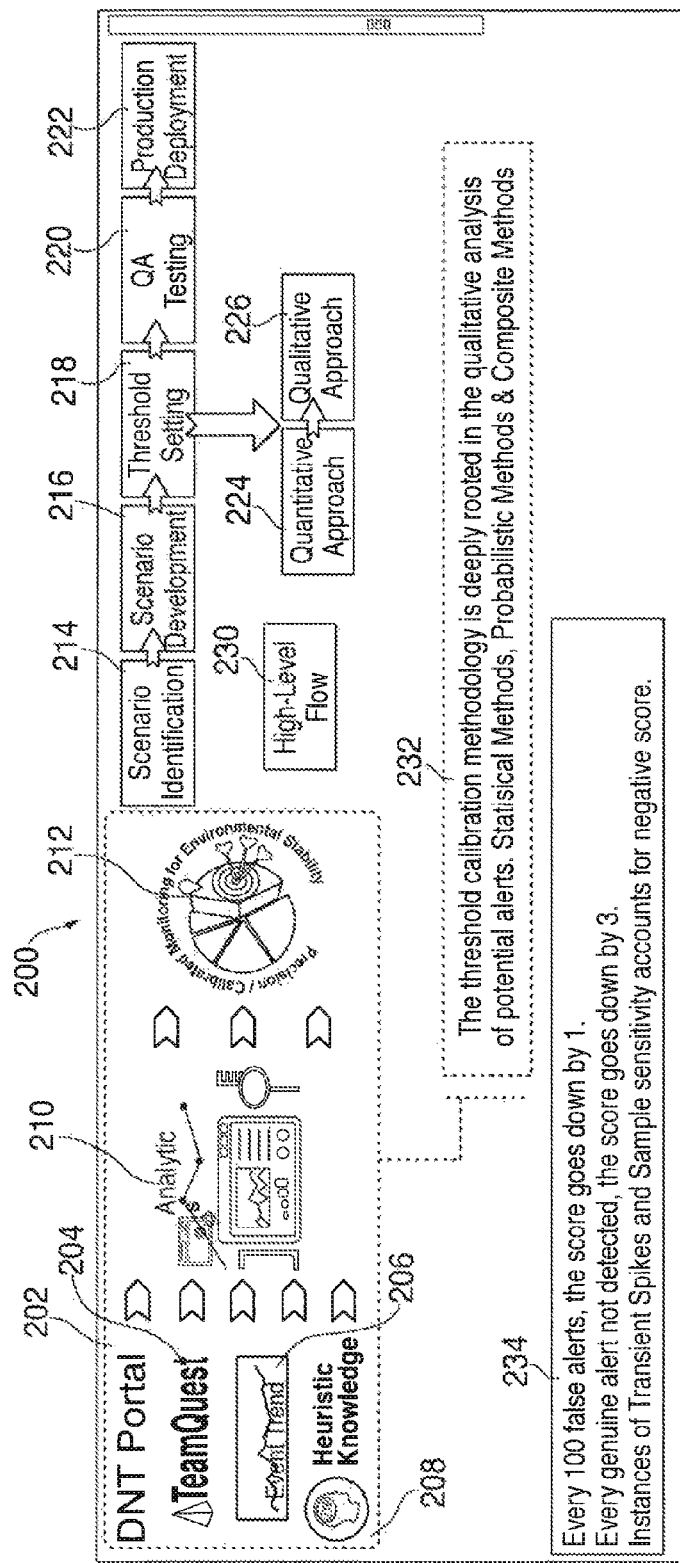
FIG. 2 shows an illustrative diagram in accordance with an embodiment of the invention.

Monitoring is crucial in computer systems. Monitoring enables information technology ("IT") personnel, operators and even computers themselves to identify system errors, repair system errors and otherwise maintain the health of the computer system.

In many computer monitoring systems, static monitoring is used. In systems which utilize static monitoring, a system event that was classified as an error event may be transmitted to an error receiving module. In order for the error receiving module to allocate computer resources as well as human resources appropriately, it is important that the error receiving module receive all of the true error events and prevent receipt of mislabeled error events. Therefore, it is important that the threshold level be set accurately.

Use of static monitoring system threshold levels involves certain drawbacks. One specific drawback may be that static monitoring system threshold levels may be unable to maintain a threshold level which enables the error receiving module to continually receive all of the error events and prevent receipt of mislabeled or otherwise misidentified error events. This may be because applications and modules within systems may be constantly changing and evolving, and therefore static threshold levels may become obsolete soon after their implementation. Therefore, a dynamic monitoring system is needed. The dynamic monitoring system may implement a self-monitoring calibrator. The self-monitoring calibrator may adjust threshold levels and thereby substantially continuously maintain the effectiveness of the error receiving module.

A method for calibration is provided. The method may include receiving a plurality of error events at a cost-effective continuous error data pooler. The method may include analyzing each event included in the plurality of error events. The analyzing may include determining the cause of the event, the computer components affected by the event, an amount of processor cycles and/or time that by the event remediation requires as well as any other suitable information.

The method may also include assigning each event, included in the plurality of events, to at least one configuration item. The assigning may be based on the analyzing. The configuration item may be selected from a plurality of configuration items. The configuration items may relate to, for example, memory or memory warnings, a database or database warning, an application or an application warning as well as any other items, warnings relating to such items, or other technical information.

In embodiments which include receipt of a plurality of mislabeled error events, the method may also include reducing a threshold effectiveness level associated with a configuration item. The reduction may be in response to receipt of a mislabeled error event i.e., an error event which is not a true error event, and the mislabeled error event caused a maximum error event tally to reach a predetermined number. In some embodiments, the predetermined number may be one hundred or any other suitable number.

At times, a receiver may receive hundreds of error events, yet only a handful of the events are true error events. The mislabeling of these events and the attention and resources allocated thereto may waste resources. For example, mislabeled error events may require review, examination, and repair and therefore waste valuable resources, while, had the same events been correctly labeled performance events, the events may not have even necessitated review. Therefore, it is important to reduce the amount of mislabeled error events. In order to reduce the amount of mislabeled error events, a threshold level which is adjusted based on the threshold effectiveness level may be utilized. The threshold effectiveness levels may be evaluated on a one through ten scale, a one through one hundred scale or any other suitable scale.

In embodiments which include failure to detect a true error event, the method may include reducing the threshold effectiveness level. The reduction may be in response to receipt of a notification that a true error event failed to be detected—i.e., an error event occurred but was not received and/or stored by the system. In some embodiments, which may utilize a one through ten threshold effectiveness scale, when a true error occurs but is not detected, the threshold effectiveness level may be reduced by three or by some other suitable metric.

In embodiments which include receipt of a plurality of mislabeled error events, the method may further include, in response to a reduction in the threshold effectiveness level, increasing an associated threshold. The increasing the threshold may be implemented in response to receipt of a mislabeled error event in combination with the mislabeled error event causing the maximum error event tally to reach a predetermined number. The maximum error event tally may enable receipt of a minority of mislabeled error events independent of a threshold shift which may allow for a small margin of inaccuracy.

In embodiments which include failure to detect a true error event, the method may include decreasing a threshold, associated with the threshold effectiveness level. The decreasing may be preferably be implemented when the threshold effectiveness level was reduced upon receipt of notification that the true error failed to be detected by the continuous data pooler.

In some embodiments, utilizing a one through ten threshold effectiveness scale, when the threshold effectiveness level is five, four, three two or one, the method may include increasing or decreasing the threshold, depending on the cause of the reduction of the threshold effectiveness level. In some embodiments, when the threshold effectiveness level is six, the method may include increasing or decreasing the threshold depending on the cause of the reduction of the threshold effectiveness level. In other embodiments, where the threshold is six, the method may include maintaining the threshold. In some embodiments, when the threshold effectiveness level is seven, eight or nine, the method may also include maintaining the threshold.

The method may also include showing a table to a user on a GUI. The table may include a plurality of configuration items. The table may also include the threshold effectiveness level for each configuration item, included in the plurality of configuration items. The table may also include the threshold level for each configuration item, included in the plurality of configuration items. The method may also include showing, to the user, a recommended threshold for each configuration item in the plurality of configuration items. The method may also include adjusting the threshold to the recommended threshold. In some embodiments, where the threshold effectiveness level utilizes a one through ten scale, the method may also include initializing the threshold effectiveness level to ten in response to a shift in the existing threshold.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

FIG. 1 shows an illustrative GUI webpage 100. GUI 100 may be presented to an operator. GUI 100 may enable an operator to view numerous servers, configuration items associated with each server, threshold effectiveness levels associated with each configuration item, an existing threshold level associated with each configuration item, a recommended threshold levels associated with each configuration item and comments.

The GUI webpage may be entitled monitoring calibrator. The http address may an internal website or external website, as shown at 102. The tab may be monitoring calibrator, as shown at 104. An operator may be enabled to enter a server name, as shown at 106, into text entry field 108. The system may show choices of possible server names upon receipt of type from the operator, as shown at 110. The system may also enable an operator to enter an application, as shown at 114.

The operator may have chosen server "usdlswl". The GUI may include a table. The table may include column 128 (Situation Name), column 130 (TH (threshold) Effectiveness), column 132 (Existing Threshold), column 134 (Recommended Threshold), column 136 (Comments) and any other suitable columns.

Row 116 may relate to situation "W_abc_def_11_Crit001@hostname". The situation may relate to a configuration item. The threshold effectiveness level for row 116 may be 5-4. This may indicate that the existing threshold of 90% may require shifting to the recommended threshold of 95% in order to raise the threshold effectiveness level. The 5-4 threshold effectiveness level may be relatively low because of receipt of numerous false positive error events. Therefore, the calibrator may recommend, and/or implement, an increase in the threshold level. The comments may explain that the monitor threshold effectiveness is calculated as a percentage.

Row 118 may relate to situation "W_abc_xyz_22_Warn001@hostname". The situation may relate to a configuration item. The threshold effectiveness level for row 118 may be 6-6. A threshold effectiveness level of 6-6 may indicate that the existing threshold of 95% may require shifting to the recommended threshold of 90%. The 6-6 threshold effectiveness level and the recommend decrease may be because true error events failed to be detected. When a threshold effectiveness level of 6-6 indicates that too many false positive error events were received, the associated threshold may be reduced. The comments explain that historic performance data, event trends and heuristic knowledge would be data points for the metric.

Rows 120 and 122 are grouped together into one row. Situations "W_1mn_opg_Warn002@hostname" and "W_rstv_444_Crit-001@hostname" may both have a threshold effectiveness level of eight. In rows 120 and 122, the existing threshold may be the same as the recommended threshold. Because both the existing threshold and the recommended threshold have a value of 85%, the threshold shown in rows 120 and 122 may not require shifting. The comments explain that benefits gained from incorporating a qualitative process includes identification of redundant scenarios (wherein the same errors occur continually or the same false errors are received continually), reduced false positives and environment stability.

Some embodiments may determine what caused the decrease in the threshold effectiveness level from the initial level.

Rows 124 and 126 are grouped together into one row. Situations "W_def'00_6_Crit002@hostname" and "W_aaa_444_rr33_Warn001@hostname" may both have a threshold effectiveness level of eight. This may indicate that the existing threshold of 90% may be appropriate as shown that 90% is the recommended threshold. The comments explain that a combination of the number of false positives and the number of real events un-captured would account for the offset of threshold efficiency.

FIG. 2 shows an illustrative diagram 200. The system uses DNT portal 202, TeamQuest 204, event trends 206, heuristic knowledge 208 and analyzes the information, as shown at 210, to create precision, calibrated monitoring which may cause environment stability, as shown at 212.

A high level flow 230 may be shown in steps 214 through 226. Scenario identification 214 may lead to scenario development 216. Scenario development 216 may lead to threshold setting 218 for each scenario. Each scenario may relate to a particular configuration item. Threshold setting 218 may lead to a quantitative approach 224 i.e., an integer number of errors per unit time or any other suitable rate—and a qualitative approach 226—i.e., the quality and/or scope of the error, for example, are these errors going to cause a system or application failure. Threshold setting 218 may also lead to QA (question and answer) testing 220, which may include testing of the threshold to ensure accuracy. Upon completion of testing, the product may be deployed, as shown at 222.

Note 232 shows the threshold calibration methodology may stem from qualitative analysis of potential alerts, statistical methods, probabilistic methods and composite methods. Note 234 shows an exemplary threshold scoring method, utilizing a one through ten scale, wherein upon receipt of 100 false alerts, the threshold effectiveness level is reduced by a score of one. The exemplary methods may also include reducing the score by three for every genuine alert not detected. Instances of transient spikes and sample sensitivity may account for negative scoring.

Figure 3:
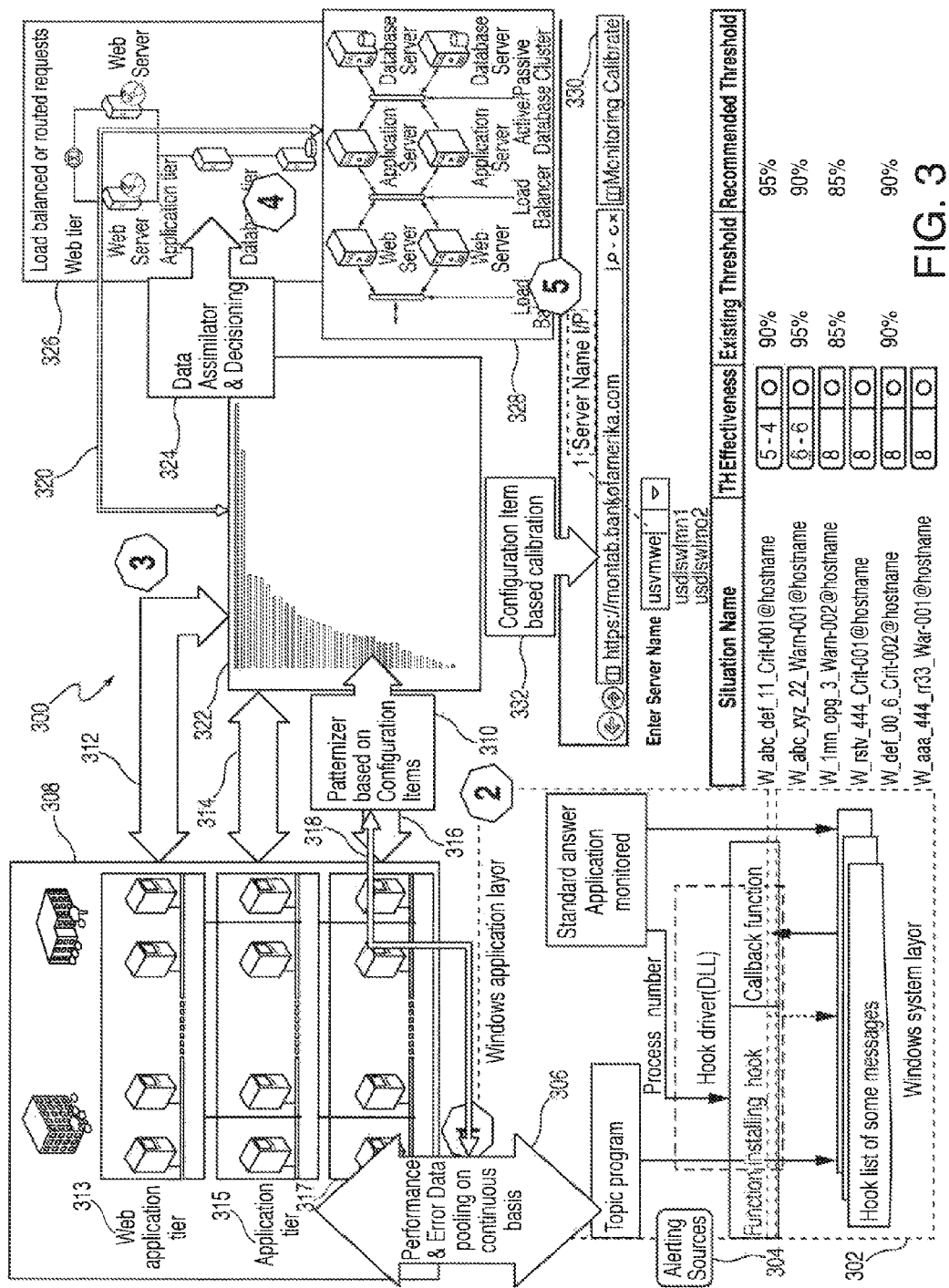
FIG. 3 shows an illustrative diagram in accordance with the principles of the invention.

FIG. 3 shows a high level process view 300. The components of FIG. 3 have been separated and further explained in greater detail in the figures which will follow. A plurality of errors may be received from a plurality of alerting sources 304. Alerting sources 304 may include windows application layer and windows system layer as shown at 302.

The system may execute performance and error data pooling on a continual, periodic or random basis, as shown at 306. The system may associate each error with a tier included in 308, for example web application tier 313, application tier 315 and database tier 317. The error information may be transferred to a patternizer, as shown at 318. The system may utilize a patternizer to pattern the events based on configuration items, as shown at 310. The patterns may appear in a graph, as shown at 322. Connecting arrow 312 may indicate that web application tier 313 may be associated with the patterns. Connecting arrow 314 may indicate that application tier 315 may be associated with the patterns. Connecting arrow 316 may indicate that database tier 317 may be associated with the patterns.

The information from the patterns may be transferred to the servers at 328, as shown using connecting arrow 320. The data assimilator and decisioning module 324 may utilize architecture diagrams 326 and 328 to properly utilize the patterned and assimilated data to repair or remediate errors in the systems. The information may be presented to a user in GUI format, as shown at GUI 330. The GUI may enable a user to view configuration-item-based calibration, as shown at 332.

Figure 4:
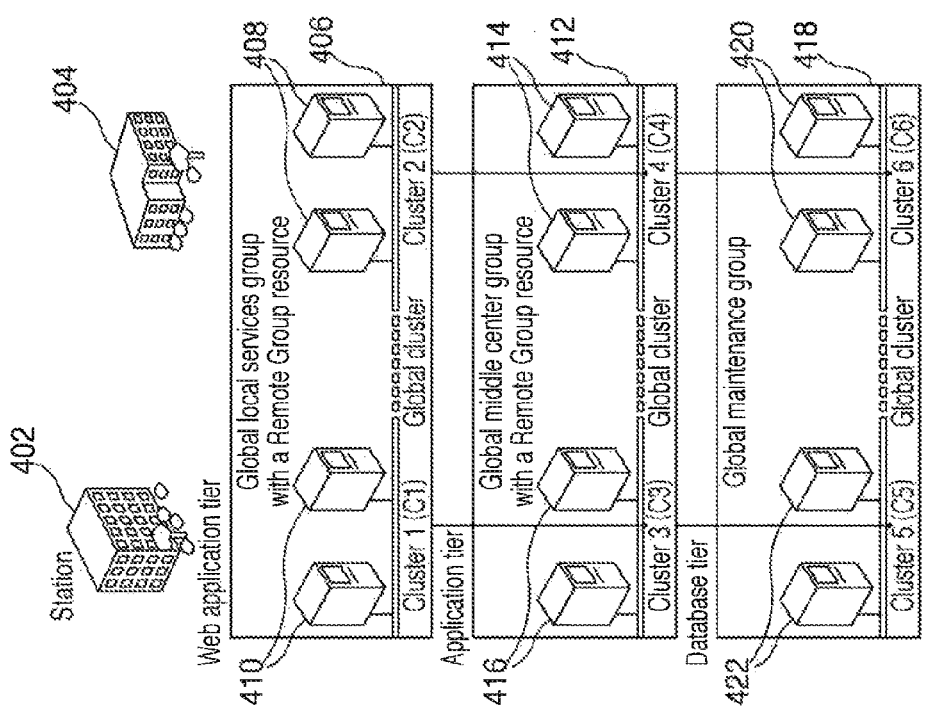
FIG. 4 shows an illustrative diagram in accordance with an embodiment of the invention.

FIG. 4 shows an illustrative diagram. Stations 402 and locations 404 may include web application tier 406, application tier 412 and database tier 418. Web application tier 406 may include a global local services group with a remote group resource. The web application tier may include cluster 1, as shown at 410 and cluster 2, as shown at 408.

Application tier 412 may include a global middle center group with a remote group resource. The application tier 412 may include cluster 3, as shown at 416 and cluster 4, as shown at 414.

Database tier 418 may include a global maintenance group. The database tier may include cluster 5, as shown at 422 and cluster 6, as shown at 420.

Figure 5:
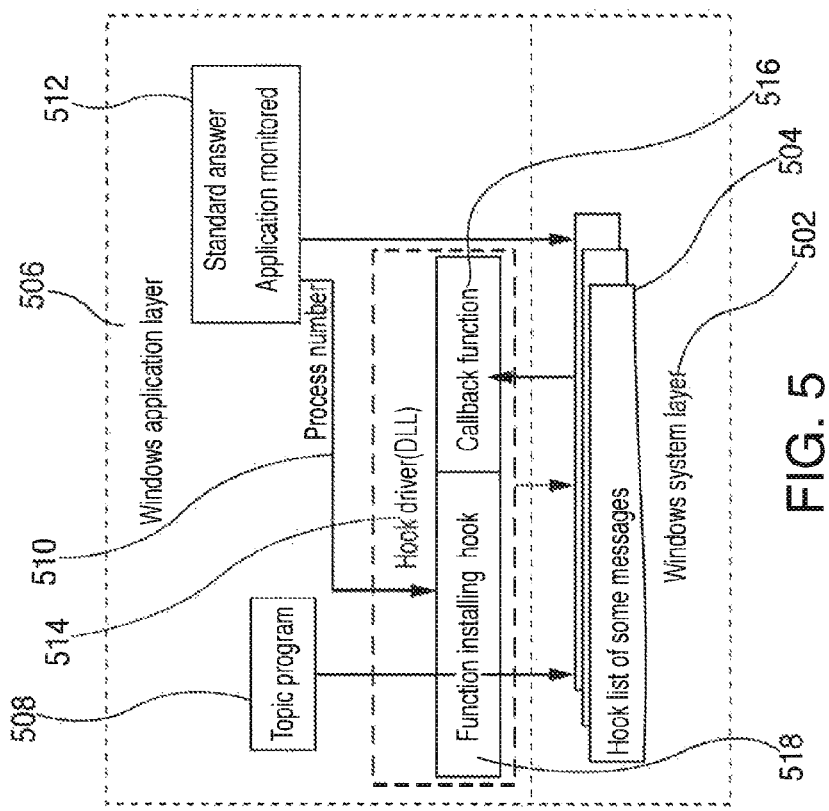
FIG. 5 shows an illustrative diagram in accordance with an embodiment of the invention.

FIG. 5 shows an illustrative diagram. Windows application layer 506 may include a topic program 508. Topic program 508 may transmit a message to the hook list of some messages 504 included in windows system layer 502. Standard answer and application monitored 512 may also transmit a message to the hook list of some messages 504. Standard answer and application monitored 512 may also transmit a process number 510 to function installing hook 518. Function installing hook 518 and callback function 516 may be associated with hook driver 514, which may be a library file with a .dll file extension. Function installing hook 518 may transmit the received process number to hook list 504. Callback function 516 may retrieve the information pertaining to the process number transmitted by function installing hook 518. The retrieved information may be topic program 508 which may have transmitted itself as a message.

FIG. 6 shows model patterns of configuration items. Configuration item baselines, which have been described above, may be created or modified based on a behavior pattern of an event in relation to other parameters. An exemplary configuration item baseline may include a CPU crossing a threshold with associated disk read failure more than a predetermined amount of times.

Element 606 may represent baseline points on the X-axis of the graph. Element 602 may represent configuration item information on the Y-axis of the graph. Element 604 may represent an exemplary configuration item with a relatively large amount of events.

Figure 7:
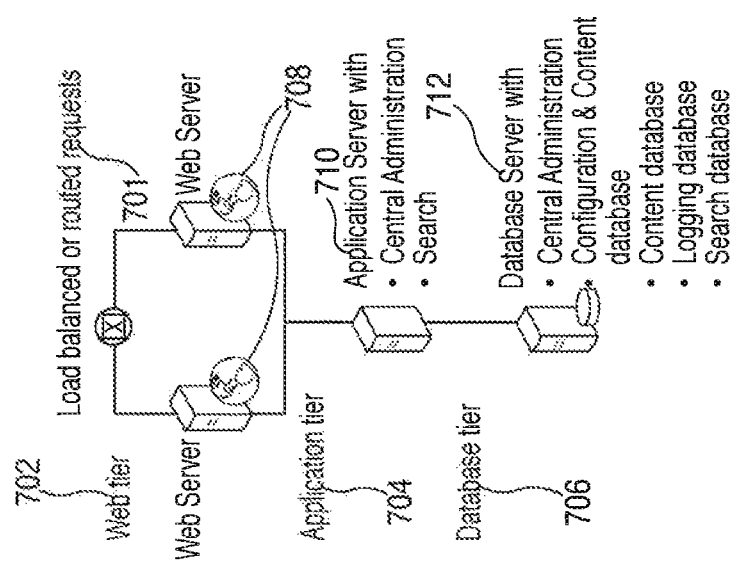
FIG. 7 shows an illustrative diagram in accordance with an embodiment of the invention.

FIG. 7 shows an illustrative architecture diagram. The diagram may show identification of errors and execution of load balancing or routed requests, as shown at 701. The architecture may include a web tier 702. The web tier may include web servers 708. The architecture may also include an application tier 704. Application tier 704 may include an application server with a central administration and a search, as shown at 710. The architecture may also include a database tier 706. Database tier 706 may include a database server with a central administration, configuration and content database, a content database, a logging database and a search database, as shown at 712.

Figure 8:
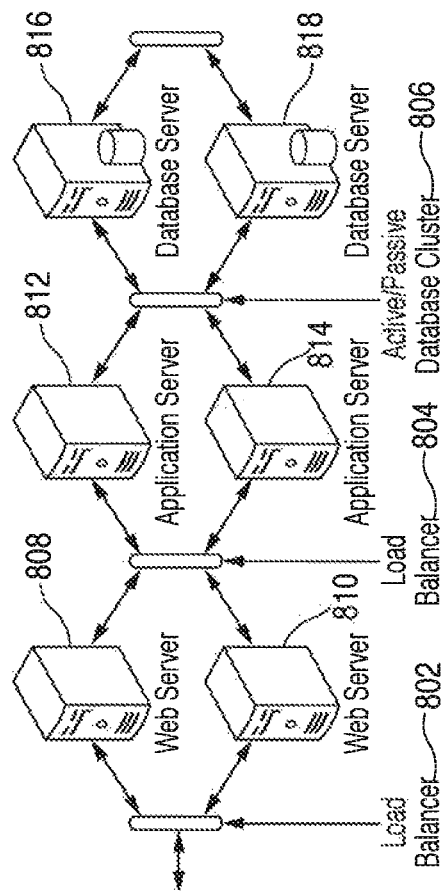
FIG. 8 shows an illustrative diagram in accordance with an embodiment of the invention.

FIG. 8 shows another illustrative architecture diagram. The diagram may be used to identify errors and execute load balancing. Load balancing may be distributing workloads across multiple computing resources. The computing resources may include computers, computer clusters, CPUs (central processing units), disk drives, memory drives, network links, peripheral devices and any other suitable computer resources. The architecture may include load balancers 802 and 804 and active/passive database clusters 806. A cluster may include a group of computers or databases that work together and may be viewed as a single system. An active/passive cluster may be a system with at least two distinct nodes, wherein at least one node is active i.e., being utilized on a consistent basis, and at least one node is passive i.e., utilized when necessary, for example when the active node is overloaded or the active node incurred a failure. The architecture may include web severs 808 and 810, application servers 812 and 814 and database servers 816 and 818.

Figure 9:
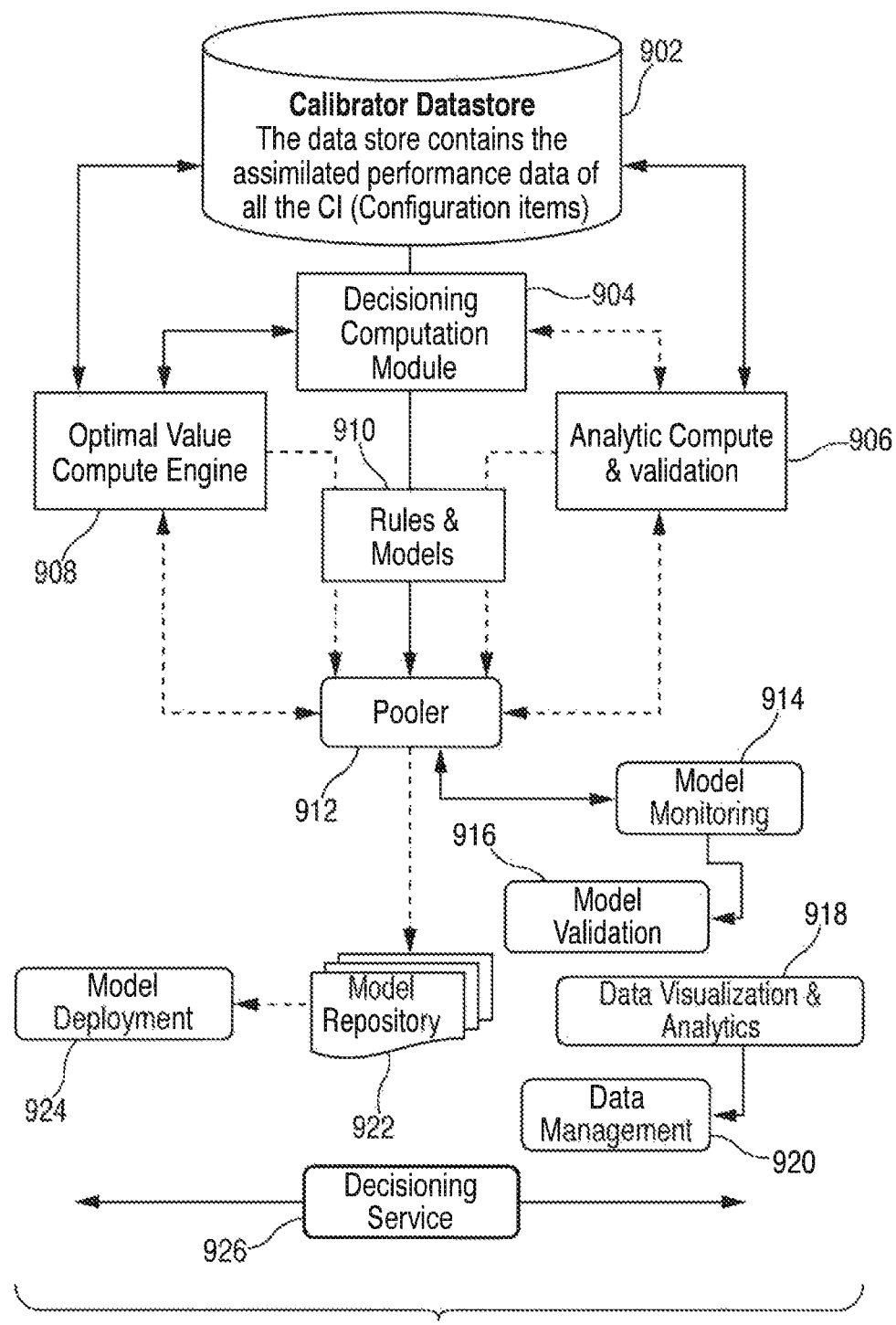
FIG. 9 shows an illustrative flow diagram in accordance with an embodiment of the invention.

FIG. 9 shows an illustrative flow diagram. Calibrator datastore 902 may contain substantially all of the assimilated performance data of all of the configuration items ("CI"). Calibrator datastore 902 may be in communication with optimal value compute engine 908. Optimal value compute engine 908 may determine an optimal threshold value for each configuration item contained in calibrator datastore 902. The optimal threshold value may enable a receiver, associated with the calibrator datastore, to receive true error event information that occurred in a system and prevent the receiver from receiving false error event information that occurred in the system.

Decisioning computation module 904 may be in communication with calibrator datastore 902, optimal value compute engine 908 and analytic compute and validation module 906. Decisioning computation module 904 may determine whether the receiver missed true error event information that occurred in the system or received a false error event.

Analytic compute and validation module 906 may be communication with calibrator datastore 902 and decisioning computation module 904. The analytic computation and validation module may compute threshold effectiveness levels based on heuristic algorithms. The heuristic algorithms may utilize the received true error event information and/or one or more false error events.

Rules and Models 910 may include rules and/or models for use in connection with linking the optimal value compute engine 908, decisioning computation module 904, analytic compute and validation module 906 to pooler 912. Pooler 912 may link optimal value computation engine 908, decisioning computation module 904 and analytic computation and validation module 906 to a modeling system that ensures compliance of a model of the system with a set of model standards.

The modeling system may include model repository 922 connected to pooler 912. Model repository 922 may include a plurality of acceptable system models. The modeling system may also include model monitoring module 914, connected to pooler 912, that determines whether the system is in compliance with the model. The modeling system may include model validation 916, connected to model monitoring 914. Model validation 914 may validate that the system is in compliance with the model. The modeling system may also include data visualization and analytics 918 which may determine whether the model is the optimal model for the system. The modeling system may also include data management 920, which may be connected to data visualization and analytics 918, which may manage modal data associated with the model. Decisioning service 926 may enable activities within the modeling system to occur.

Figure 10:
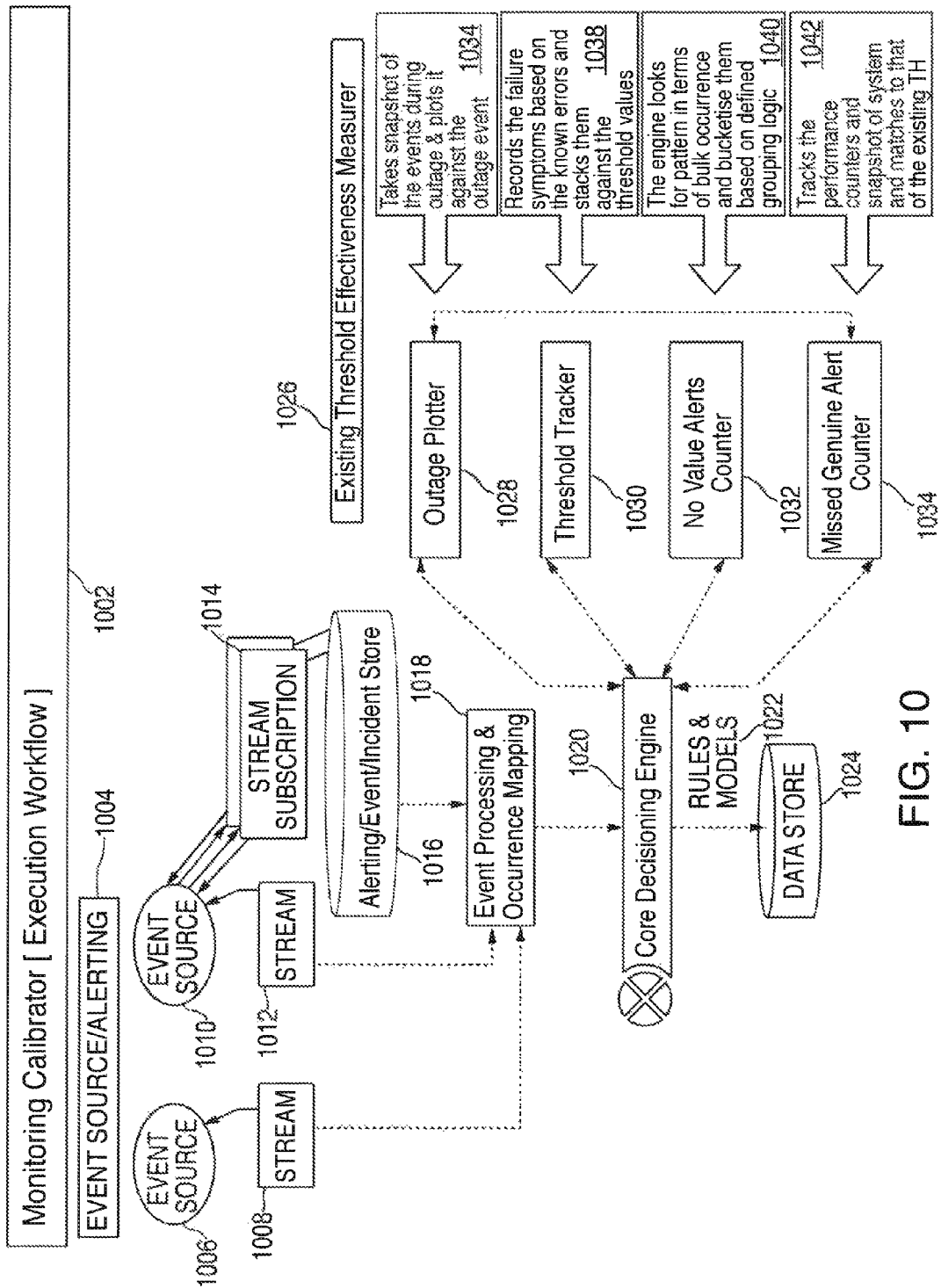
FIG. 10 shows an illustrative flow diagram in accordance with the principles of the invention.

FIG. 10 shows an illustrative flow diagram. Heading 1102 shows that the flow diagram is directed to an execution workflow of a monitoring calibrator. Error events and performance events may originate at event source/alerting locations 1004. Event source 1006 may be a source of an event, for example, a personal computer ("PC") may be a source for an error event. Stream 1008 may be connected to event source 1006. Event source 1010 may be a source for an event, for example, a database may be a source for a performance event. Event source 1010 may be linked to stream 1012. Event source 1010 may also be linked to stream subscription 1014. Stream subscription 1014 may transmit information received from event source 1006 to alerting/event/incident store 1016.

Streams 1008 and 1012 may transmit error and performance event information received from event sources 1006 and 1010 to event processing and occurrence mapping module 1018. Event processing and occurrence mapping module 1018 may process the events using the quantity of each event as well as other suitable information. Event processing and occurrence mapping module may transmit the information to core decisioning engine 1020. Core decisioning engine 1020 may utilize rules and models 1022 to transmit information to be stored in data store 1024.

Core decisioning engine 1020 may utilize existing threshold effectiveness measurer 1026. Existing threshold effectiveness measurer 1026 may be included in core decisioning engine 1020. Existing threshold effectiveness measurer 1026 may include outage plotter 1028. Outage plotter 1028 may take snapshots of events during an outage. Outage plotter 1028 may also plot the snapshots against the outage events, as shown at 1034.

Existing threshold effectiveness measurer 1026 may include threshold tracker 1030. Threshold tracker 1030 may record the failure symptoms based on the known errors and stacks the errors against the threshold values, as shown at 1038.

Existing threshold effectiveness measurer 1026 may include no value alerts counter 1032. No value alerts counter 1032 may look for patterns based on quantity of occurrences of each error and associate the errors into buckets based on a defined grouping logic, as shown at 1040.

Existing threshold effectiveness measurer 1026 may include missed genuine alert counter 1034. Missed genuine alert counter 1034 may track performance counters. Missed genuine alerts counter 1034 may also track snapshots of the system. Missed genuine alert counter 1034 may match the performance counters and the tracked snapshots to the existing threshold level, as shown at 1042.

Thus, systems and methods for providing a self-monitoring and self-adjusting calibrator have been described. Persons skilled in the art will appreciate that the present invention can be practiced by other than the described embodiments, which are presented for purposes of illustration rather than of limitation, and that the present invention is limited only by the claims that follow.

What is claimed is:

1. A method for calibration, the method comprising:
receiving a plurality of error events at a continuous error data pooler;
analyzing each event included in the plurality of error events;
assigning, based on the analyzing, each event included in the plurality of events, to at least one configuration item, said at least one configuration item selected from a plurality of configuration items;
reducing a threshold effectiveness level associated with a configuration item included in the plurality of configuration items in response to receipt of an error event, included in the plurality of error events, which is a not a true error event and the error event caused a maximum error event tally to reach a predetermined number;
reducing the threshold effectiveness level upon receipt of notification that a true error failed to be detected by the continuous data pooler.

2. The method of claim 1, further comprising increasing a threshold, associated with the threshold effectiveness level, when the threshold effectiveness level was reduced in response to the receipt of the error event which is not a true error event and the error event caused the maximum error event tally to reach a predetermined number.

3. The method of claim 2, further comprising decreasing a threshold, associated with the threshold effectiveness level, when the threshold effectiveness level was reduced upon receipt of notification that the true error failed to be detected by the continuous data pooler.

4. The method of claim 3, further comprising displaying, on a Graphical User Interface ("GUI"), a table comprising the plurality of configuration items, the threshold effectiveness level for each configuration item and the threshold level for each configuration item.

5. The method of claim 4, further comprising displaying a recommended threshold for each configuration item.

6. The method of claim 5, further comprising adjusting the threshold, for each configuration item, to the recommended threshold.

* * * * *